United States Patent Office 3,459,201
Patented Aug. 5, 1969

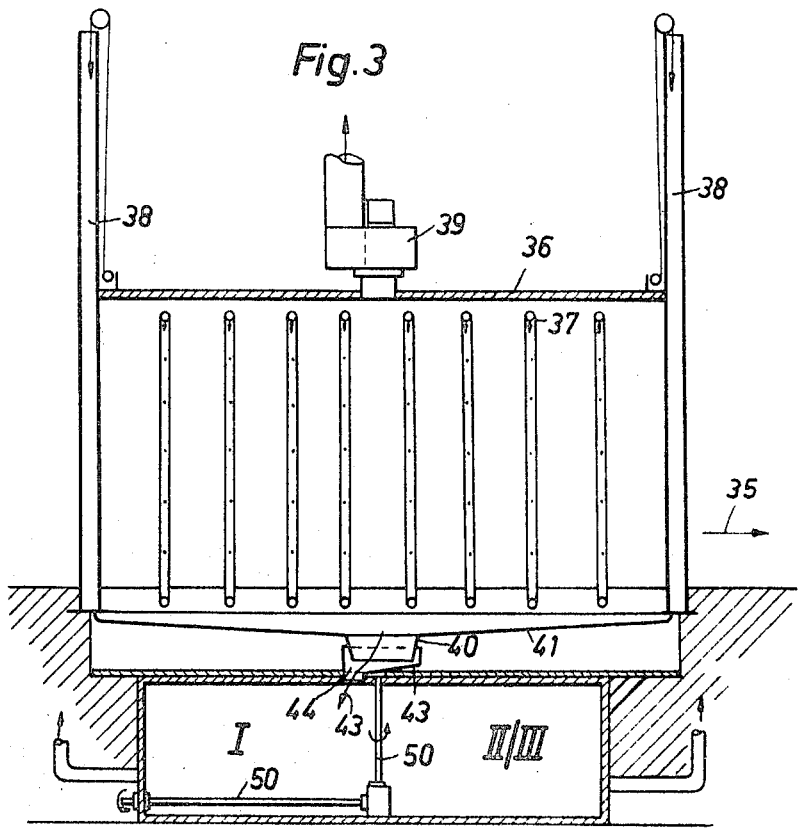
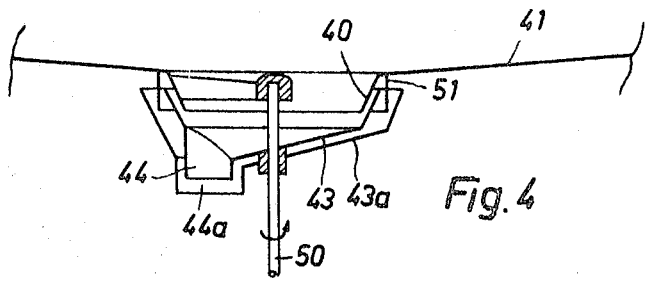

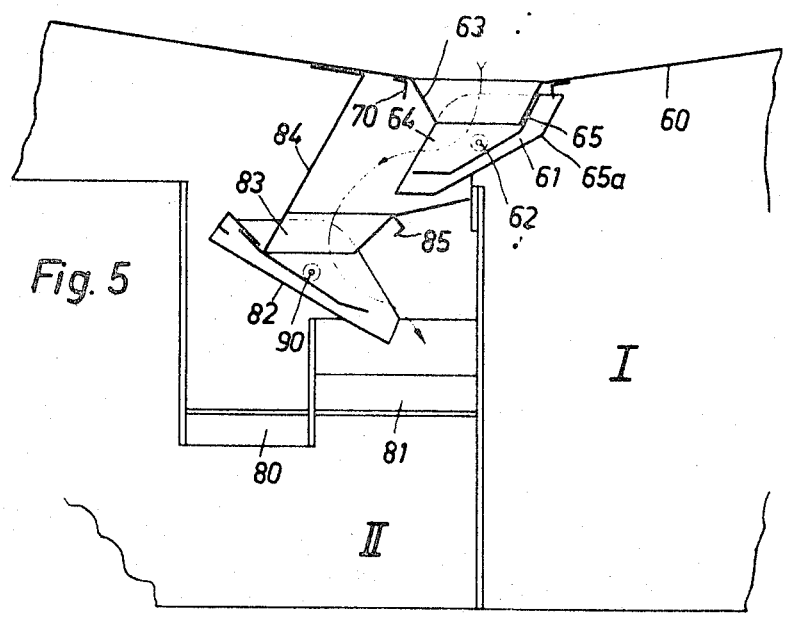
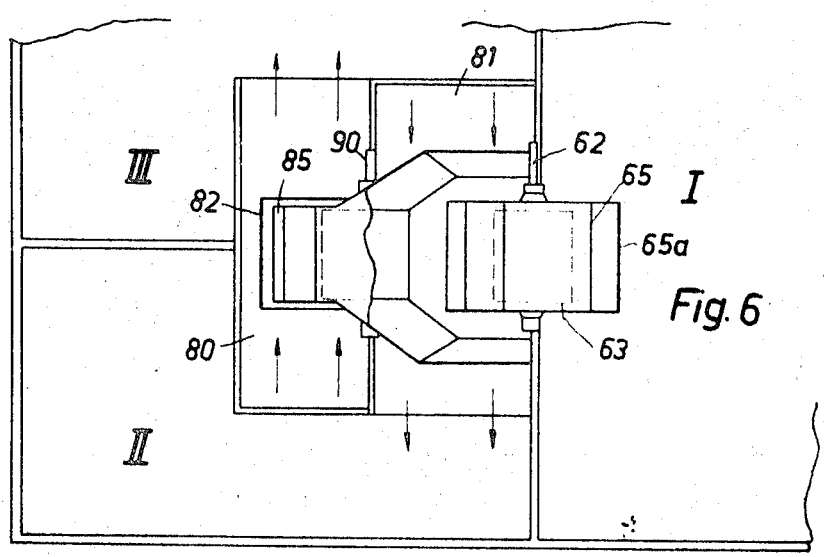

3,459,201
TREATING METAL ARTICLES WITH LIQUIDS
Wilhelm Wache, deceased, late of Hamburg-Fuhlsbuttel, Germany, by Helen Wache, heir, Hamburg-Fuhlsbuttel, Germany, and Bodo Busing, Hamburg-Wandsbek, Germany, assignors to Firma Wilhelm Wache G.m.b.H.
Filed Jan. 31, 1967, Ser. No. 619,491
Claims priority, application Germany, Feb. 4, 1966, W 40,876
Int. Cl. B08b 3/04
U.S. Cl. 134—96    11 Claims

ABSTRACT OF THE DISCLOSURE

An apparatus for treating metal bodies with at least two different types of liquids in prearranged sequences, comprising: a closed treatment receptacle for said bodies; a tank for each said liquid; separate from said receptacle; at least one change over device of flow of said liquids; having one change over input pipe line and orifice for each said tank; a conduit system with a pump for each said tank, interposed between the orifice of each said change over device and said tank; said receptacle comprising a liquid flow distributor within it; said change over device having at least one change over orifice return flow connecting with said distributor; means to operate only one of said pumps at a time; means to duct the out flow from said receptacle to the storage tank in operation at the particular time; a piston freely movable within said change over device moving in response to the pressure of one of said pumps at a time.

FIELD OF THE INVENTION

The invention relates to an arrangement for the treatment of metal workpieces by means of at least two different liquids, with at least one closeable treatment receptacle, to which liquid distributors are attached, especially spray or squirt apparatus and return flow devices for the fluids which drain off the workpieces and the receptacle walls.

Such arrangement or plants can be used in many ways. They serve, for instance, as metal washing machines or as degreasing or phosphating plants. The nature of these plants calls for at least two different fluids to be used to treat the metal workpieces successively.

DESCRIPTION OF THE PRIOR ART

It is known to arrange such plants in such a way that for each fluid a special receptacle with closed circuit is provided. The advantage of this arrangement is that fluids practically cannot mix to any noticeable extent. An essential disadvantage of these arrangements is that they are of large dimensions, especially in the length direction, even if the receptacles are placed in close succession to each other in association with a common conveyor. In this connection it has to be borne in mind that often six different fluids and therefore six receptacles have to be used in succession. Thus for instance, the first receptacle serves for degreasing, whereas the two next successive receptacles are for rinsing, in which the metal workpieces are rinsed in two operations with different liquids. Adjoining could be, for instance, a phosphating process to be followed again by two different rinsing processes.

SUMMARY OF THE INVENTION

To avoid the large space requirements of such plants, several treatments with different fluids are carried out in the same receptacle with the same or with different spraying systems. In this way space can be saved considerably. Great difficulties can, however, arise when trying to prevent or reduce the mixing of the different fluids to an economic and functionally bearable degree. In this connection it has to be borne in mind that the different liquids often have the tendency to form solid sediments or to carry with them impurities, which hinder or prevent a regular working of the different liquid circulations. This shows its effect in practice especially seriously if the plant works semi- or fully automatically, as is often required.

The object of this invention is to provide an arrangement of the kind described at the beginning, which ensures that sediments or impurities in the liquids do not disturb or hinder the working, and that mixing of the different liquids is reduced to a tolerable degree in practice in a plant which is concentrated to the smallest possible space.

This object is achieved according to the invention by an arrangement, characterized by the fact that for each treatment-liquid, in addition to a separate storage tank, also a separate pump is provided and that a return flow-pipe, which is always open, is provided between the treatment receptacle and each storage tank, and that the return flow can be set, according to choice, to any of the individual tanks. On account of this arrangement the individual liquid circuits only run together immediately in the receptacle or in front of a common liquid distributor, so that up to this point a mixing of the liquids is impossible. It is thereby especially important that every pump is used for one liquid only. On the one hand one can choose each pump for the special purposes and requirements of the liquid, on the other hand the costly and difficult procedure is avoided of draining and cleaning the pump sufficiently, before switching over from one liquid circuit to another, to ensure any mixing of the liquids is prevented. The application of a separate pump for each liquid results in another essential advantage, which will be described below with a particular embodiment of the invention. In the receptacle, which can be closed by gates or similar devices the liquids are bound to get in touch with the same surfaces. These are mainly the surfaces of the workpieces, the surfaces of the flow-devices and the surfaces of the receptacle. To prevent almost entirely at these meeting points of the liquid circuits an extensive mixing of the liquids, it is not only necessary to introduce a certain waiting time to always give the liquid an opportunity to drain into a collecting device, but it has proved especially important and advantageous for the invention to provide for the drainage a return flow, which is always open and cannot be closed by valves or anything similar. It is thereby ensured that the discharge is always open and that the liquid can quickly drain into the storage tank. At the same time it is also ensured that no deposits can accumulate at the discharge point and so cause leakages at the hitherto customary closing points leading to the tanks and, at the same time, bring on the danger that these deposits are washed into another liquid circuit by the following liquid. It is essential that the return flow, which is always open, can be changed over without closing the fluid circuits or the return flow.

As the liquids for the next working cycle are again sucked by the pump from the return-flow tanks and fed to the liquid distributor, naturally the danger also exists that impurities or coagulations or something similar can, when feeding to the liquid distributor, clog up any existing valve arrangements and lead to leakages which, in their turn, can again result in mixing of the liquids.

To avoid this danger, this invention additionally provides that at least two pumps of different fluid-circuits can be connected on the pressure side alternatively with the same distributor-device, of which one is always in open connection with the distributor-device, and that a reversing device, which can be operated by the liquid itself and serves both circuits, acts as switch. Apart from being able to utilize the same liquid distributor for at least two liquids in this arrangement, it ensures that valve devices, operated from outside by hand or remote control, become dispensable. Hereby rather the two liquid circuits are used themselves to bring, according to circumstances, the one liquid circuit or the other liquid circuit in free connection with the distributor device. Thereby the danger of forming deposits or leakages is counteracted considerably. It is thereby appropriately arranged that a freely floating plunger is provided as reversing mechanism which, on its two front faces is under the pressure of the liquids in the pressure pipelines of the pumps and which, in its end-positions always closes one of the pressure pipelines and brings the other one in open connection with the distributor device. Apart from the exceedingly simple device it is here of special importance that essentially straight open pipeline connections are used so that places hardly exist, where solid particles or impurities can settle. If such deposits should, nevertheless, occur they are again swilled away automatically after each reversing process by the same liquid circuit out of which they have been formed. Thereby leakages are avoided and the mixing of liquids prevented at their entry position into the same circuit. The position of the reversing mechanism can be regulated simply by switching the pumps on or off. As the freely floating plunger remains in its last position, when both pumps are switched off, it is achieved with certainty that the liquid distributor device runs free through gravity after the pumps have been switched off, so that the liquid returns on the same way to the storage tank, on which it had been fed-in by the pump.

Practice has shown that the return of the liquids to the different storage tanks through a connection, which is always open, can lead to considerable difficulties, as the liquid, which is running out, has the tendency to splash or to run over and can thereby cause mixing of the liquids.

To avoid this, in a special form of arrangement of the invention, a deflecting element can suitably be provided to reverse the always open return-flow of the receptacle in such a way that this pot-shaped deflecting element, which overlaps the discharge point from underneath, can turn in bearings and has itself a free discharge point at a certain distance from the turning axle. It is hereby only necessary to turn the pot-shaped discharge element to the required position, so that the liquid can freely run into the appertaining tank. To have also at this point a solid seal between the turnable deflecting element and the stationary return-flow, and to avoid thereby the danger of deposits of solid particles it can be advantageous that the deflecting element overlaps the inlet with radial play and consists of two parts of a similar shape, boxed into each other at a certain small distance with a free outlet each in the same line, which are turnable as one unit, whereby the discharge outlet itself has a collar which projects downwards into the narrow space between the two pot-shaped parts of the deflecting element.

In another form of arrangement of the invention, to reverse the always open return-flow of the receptacle, at least one deflecting part can be provided, which can be brought into different inclined positions which according to the incline, directs the discharging liquids either into the one or into the other of the chosen tanks. Also here the return-flow can always remain open, and parts or places which need sealing are avoided. It is of advantage to make this deflecting part as a seesawing kind of deflecting, gutter shaped, channel, the swivelling shaft of which could be lying preferably approximately in the middle under the opening of the discharge. The amount of incline can be adjusted in such a way that in every case the top-end of the deflecting channel rests against the wall of the discharge opening.

To ensure also in this arrangement that liquid does not get into another tank than the one intended through spilling or creeping over the wrong end of the inclined deflecting channel, contrary to the angle of incline, it has proved advantageous to make each deflecting channel of two similar channel parts, placed at a small distance above each other to form one unit, which can be adjusted to the required angle of incline as a whole. The discharge outlet can, in this case, preferably have a draining rim, facing downwards between the two top-end walls of the deflecting channel unit.

BRIEF DESCRIPTION OF THE DRAWINGS

The accompanying drawings illustrate diagrammatically and by way of example several embodiments of the invention.

FIG. 3 is a longitudinal section through a single receptacle in which the treatment with three different liquids is possible. The figure illustrates an example of the adjustment of the reverse-flow.

FIG. 4 shows on an enlarged scale a further example of the kind of adjustment according to FIG. 3.

FIG. 5 shows in vertical section another example for adjusting the reverse-flow, while FIG. 6 is a plan of the arrangement of FIG. 5 wherein the bottom of the receptacle is left out for better illustration.

DESCRIPTION OF THE PREFERRED
EMBODIMENTS

Figure 1:
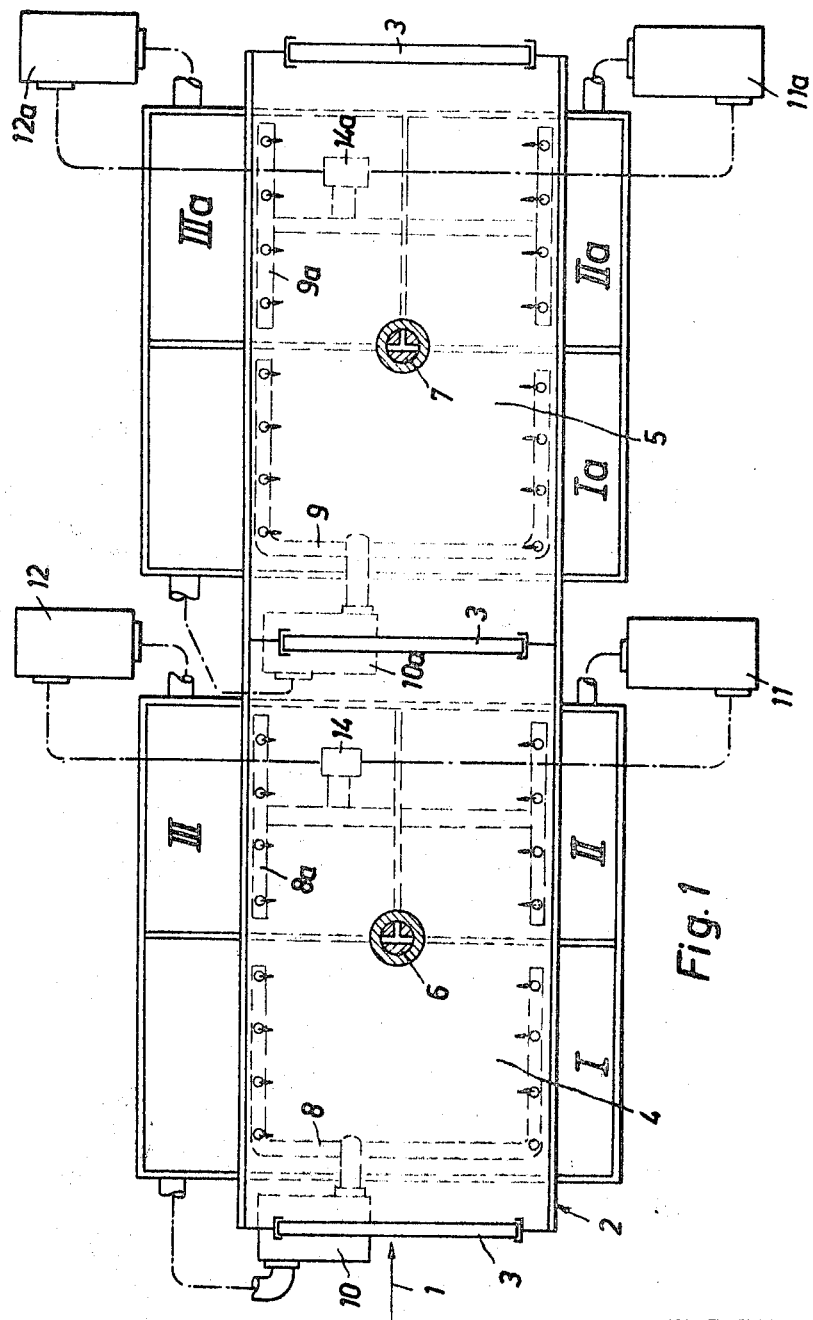
FIG. 1 is a plan view, partly in section of an installation according to the invention, intended for the treatment of metal workpieces with six different liquids.

The installation illustrated in FIG. 1 shows a conveyor for the workpieces to be treated, which runs through and is simply indicated by arrow 1 which, at the same time, shows the direction of movement. This conveyor runs through a housing 2 which is divided by three gates 3, to be lifted, swivelled or wound up in venetian-blind style, which divide the housing into two sealed receptacles 4, 5. Each receptacle 4, 5 has a central return-flow 6, 7, situated at the lowest point of the receptacle bottom, which slopes downwards towards the middle. Each receptacle has at least one liquid distributor arrangement 8, 9, the distributing pipelines of which are themselves distributed over the complete length of the receptacle and have preferably squirt- or spray-nozzles. In the example illustrated the distributing device is, in each receptacle, divided into two automatic distributors 8, 8a and 9, 9a. These two distributor-halves can also be part of one unit and switched either individually or together on to the same liquid system by choice, simply through suitable switchover devices. The example illustrated provides that, seen in the direction of movement 1, in the first half of each receptacle a treatment takes place with one liquid, for instance in the first half of receptacle 4 a treatment can take place with a degreasing liquid, whereas in the first half of receptacle 5 a treatment with a phosphating liquid could be carried out. In the second half of each receptacle two treatments take place, namely in each case with rinsing liquids of which, for instance, the one could be a hot rinsing liquid and the other a cold rinsing liquid. Accordingly each receptacle has three stroage tanks 1–111a, 1a–111a which are, in the illustrated example, immediately below the installation. The tanks can also be installed at any other place, for instance in the cellar of the factory building.

Pumps 10–12 and 10a–12a serve to supply the liquids, which are needed at the time, to the distributor devices. The illustration shows, as is essential for the invention, that a separate pump is provided for each liquid. The same liquid therefore always flows through each pump, so that mixing with other liquid-sorts through sediments cannot take place. Each pump is connected with its sustion side to the corresponding tank, whereas the pressure side leads to the corresponding liquid distributor system. In the example illustrated, in the second half of each receptacle, only one liquid distributor system is shown for both rinsing liquids namely for the two liquids from tanks 11 and 111. To prevent, however, a noticeable mixing of the liquids in the supplying system, a specially constructed switch-over device 14 is provided, which is described below in connection with FIG. 2.

Figure 2:
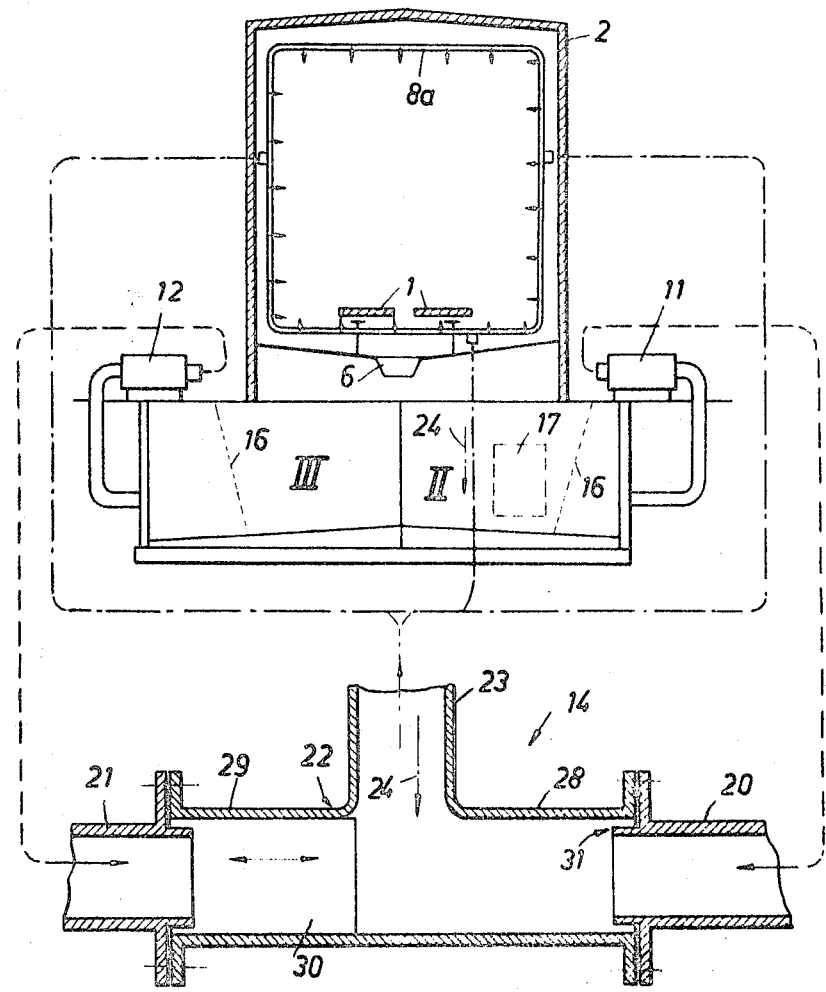
FIG. 2 is a section through the installation of FIG. 1 and illustrates the way in which two liquid circuits are brought together into a common liquid distributor arrangement and the way in which the circuits are adjusted.

One can see in FIG. 2, which is a section through the arrangement of receptacle 4 to FIG. 1, that each storage tank can be provided with a filter device 16 between entry-side and exit-side. The one tank or both tanks can also be provided with a heating device of any suitable type, as indicated at 17.

The illustration also shows that the pressure pipelines of the pumps 11 and 12 end at the co-axially situated connecting flanges 20 and 21 of the reversing device 14. Between both flanges is a T shaped distributor piece 22 with its connection 23, which leads to the liquid distributor 8a. In the example illustrated three supply pipelines are provided, but it is obvious that any number of such pipelines can be provided. It is only essential that one of these lines is connected to the lowest point of the distributor 8a, so that there is a natural drop from the distributor device 8a to the tank to ensure drainage only through gravity of the liquid from the distributor device and the reversing device when both pumps are stopped. This drainage or running out is indicated by arrows 24 in FIG. 2.

In the two-coaxial portions of the T shaped distributor piece 22a freely floating switch-over piston 30 is guided, the flat faces of which can touch and seal off the inward projecting ring-shaped valve faces 31 of the connecting pipes 20 and 21. To achieve the necessary sealing elastic sealing parts or valve seat-elements can be provided at the connecting pipes and for the faces of the plunger 30, which are not shown for reasons of simplification.

The movement of the freely floating plunger 30 is caused solely by the liquid pressure or rather by the pressure difference in the two connecting pipes 20 and 21, whereby it is ensured that only one pump can be switched on at a certain moment, so that there is always sufficient difference of pressure to hold the freely floating plunger 30 in a predetermined closing position, i.e. in a touching and sealing position against the ring-shaped projection of one connecting pipe. After switching off this pump the piston remains in its last position, so that the distributing system 8a can drain empty through gravity only in the direction of the arrows 24. This reversing device ensures a definite separation of the two liquid systems although they have a common distributor arrangement. It is not necessary to handle or regulate by hand this device, as it is worked automatically by the action of the pumps 11 and 12. A further inportant advantage results from the open and simple pipelines for the liquids and from the fact that any residues etc. are swilled away by the liquid so that leakages or mixing cannot be caused hereby.

In case it is desired to feed three or more different liquids to the same distributing device this can be done without difficulty in the same way by placing two or more reversing devices 14 in succession. For instance, when using three different liquids, the connection 23 of the reversing device 14 can be connected to one of the co-axial connecting pipes of second distributing piece 14, whereas the other co-axial connecting pipe of this second reversing device is connected to the third pump and the distribution device is then connected to the single connecting pipe of the second reversing device. As always only one pump is working at a time. This results in a definite liquid flow direction between the pressure side of the switched-on pump and the distributor device 8a, as the two other flow directions are totally closed. Also in such a cascade connection of several reversing devices the adjustment of the freely floating plungers are provided automatically by the liquids themselves, namely entirely by the action of the three or more pumps.

FIG. 3 shows a longitudinal section through a single receptacle which can be fed and emptied only from one side or, as indicated by arrow 35, is run through in the same direction. In the receptacle housing 36 distributing devices 37 for the liquids are provided as in the previously shown arrangement example whereas the receptacle can be closed and sealed off by gates 38 or similar devices. A ventilating device 39 takes the produced fumes away.

Storage tanks are provided underneath the housing 36 as in the arrangement example to FIG. 1 and it is again assumed that three storage tanks are provided for receptacle 4. At the junction of the three tanks a return-flow 40, which forms a funnel, is concentrically arranged at the lowest point of the sloping bottom 41 of the receptacle. The liquid which drains from the workpieces, the walls of the receptacle and the surfaces of the transporting arrangement runs over the bottom of the receptacle and through the funnel 40 in direction of arrow 42.

To ensure that the funnel 40 is always in open connection with one of the tanks, this arrangement example shows a deflecting device 43 which is illustrated in a special form in an enlarged scale in FIG. 4. The following description refers to both FIGURES 3 and 4.

The deflecting device 43 has the shape of a pot which is open at the top and has a sloping bottom and the sidewall of which overlaps the return-flow or funnel 40 with radial play. This pot-shaped deflecting device has eccentrically a free drainage opening 44 and is turnable in bearings round a vertical shaft. It can be turned from the outside by a shaft-connection into definite positions where the drainage opening is always over one or the other of the three tanks. Between the return-flow or funnel 40 and the sidewall of the deflecting device 43 sliding seals can be provided to prevent splashing or creeping of the liquid to the outside and thereby a mixing of the liquids.

As such sealing places can induce deposits and thereby leakages the arrangement according to FIG. 4 shows the advantage that the deflecting device consists of two parts of a similar pot-shaped form 43 and 43a, boxed into each other at a small distance with a free co-axial outlet each 44 and 44a, which are turnable by shaft 50 as one unit. Preferably an apron-shaped collar 51 is provided on the underside of the bottom 41 of the receptacle projecting downwards into the narrow space between the two pot-shaped deflecting portions and collects all spilt liquid and drains it into the second pot-shaped deflecting portion and thereby to the corresponding discharge opening. On account of the above mentioned space any sediments or solid deposits are easily washed away during working by the liquid itself, so that a long safe method of working is assured and mixing is definitely prevented.

The distribution of the returning liquids into the two or more tanks through an always open and unobstructed discharge opening can also advantageously be achieved with the aid of tilting deflecting devices as shown in FIGS. 5 and 6. In FIG. 5 the receptacle bottom is marked as 60 whereas this bottom has been omitted in FIG. 6 to allow a plan view on the deflecting arrangement. The deflecting arrangement consists mainly of a tilting gutter-shaped channel device 61, the tilting or swivelling shaft 62 which is lying approximately under the centre of the discharge funnel 63 and is formed by two side walls 64 and the channel bottom. The sidewalls are shaped in such a way that they always overlap the discharge funnel 63 to prevent liquid over-spilling sideways. The ends of the channel bottom 65 are, with advantage, bent at such an angle that the top-end of the deflecting channel, when inclined, rests on the outside of the discharge funnel 30 and thereby limits the amount of incline. To solve also here the sealing problem in a simple, safe and practical way the channel bottom is made of two similar channel portions, placed at a short distance above each other, leaving a space between each other into which, at each maximum swivel position a draining rim 70, facing downwards from the receptacle bottom 60, projects. This arrangement has proved exceedingly important and useful in practice to prevent any mixing of the return flowing liquids. With only two storage tanks the channel ends can, in both inclined positions, be just above the tank into which the liquid is supposed to run. When using three or more tanks the distribution can, with advantage, be made in such a way that two or more than two gutter shaped deflecting channel devices are arranged in a cascade successive connection and feed into suitably placed distributing troughs or the like which ultimately guide the liquid into appertaining tanks. In the example illustrated in FIGS. 5 and 6 three tanks are provided, whereby tank 1 is fed directly by the top tilting channel 61, whereas the two other tanks 11 and 111 are fed over distributing troughs 80, 81, which slope in opposite directions, as indicated by arrows. A second tilting channel 82 is provided which is practically identical to tilting channel 61 and which works together with the discharge opening 83 of a collecting housing 84, which itself works in conjunction with the second end of the tilting channel 61. At the end of this deflecting housing again a deflecting or draining member 85 is provided which projects into the space between the two channel bottoms of the top end of the channel 82, and thereby guides splashing or running over water or other liquid into this space so that also this liquid runs correctly into the appropriate discharge channel 81 or 80.

Also here the tilting shaft 90 of the second channel 82 is approximately in the center under the discharge opening 83 of the collecting housing 84. With more than three storage tanks more than two tilting channels can be correspondingly disposed in a cascade arrangement or in a family tree way.

In the examples illustrated, suitable, preferably electrical locking and controlling switches are provided which ensure that a pump can only be switched on, if the appertaining deflecting devices according to FIG. 4, or FIGS. 5 and 6 are in the required position. At the same time it can be ensured that the next pump can only be switched on if after switching off the previous pump a sufficiently long time has elapsed in which the liquid can drain off the surfaces and return to the appropriate tank.

For a given succession of treatments, the control of the various devices can be set with advantage by a programme system of connections which, with suitable time-switch devices, ensure the correct succession and duration of the operations. By this method, in a simple way, an automatic working is ensured, for which the correct and troublefree behaviour of the various devices must be assumed and guaranteed. This is achieved by the simple and reliable construction and arrangement according to the invention.

What we claim is:

1. An apparatus for treating metal bodies with at least two different types of liquids in prearranged sequences, comprising: a closed treatment receptacle for said bodies; a tank for each said liquid; separate from said receptacle; at least one change over device for flow of said liquids; having one change over input pipe line and orifice for each said tank; a conduit system with a pump for each said tank, interposed between the orifice of each said change over device and said tank; said receptacle comprising a liquid flow distributor within it; said change over device having at least one change over return flow orifice connected with said distributor; means to operate only one of said pumps at a time; means to duct the out flow from said receptacle to the storage tank in operation at the particular time; a piston freely movable within said change over device moving in response to the pressure of one of said pumps at a time, the end faces of said piston being under pressure of the liquids in the pressure pipe lines of both pumps and means in said change over device to guide said piston in each of its two end positions to seal off one of the pressure change over input pipe lines and to open the other input pipe connection with the distribtor device.

2. An apparatus as claimed in claim 1, further comprising at least one deflecting device, means to tilt said at least one deflecting device at different angles of inclination to deflect the out-flowing liquid into one chosen tank, for changing over the permanently open out-flow from the treatment receptacle.

3. An apparatus as claimed in claim 2, said deflecting device formed as tilting gutter-shaped deflecting channel.

4. An apparatus as claimed in claim 3 further comprising a tilting shaft of the deflecting channel positioned approximately under the center of the discharge opening.

5. An apparatus as claimed in claim 3, the ends of the deflecting channel in the upper position resting against the wall of the discharge opening.

6. Arrangement as claimed in claim 5, characterized by the feature that the ends of the deflecting channel are bent upwards at an angle.

7. An apparatus as claimed in claim 2, each tilting deflecting channel consisting of two tilting channels which are placed at a small distance above each other and form one unit.

8. Arrangement as claimed in claim 7, characterized by the discharge having a downward facing draining device which projects into the space between the two channels of the top-end of the deflecting device.

9. An apparatus as claimed in claim 2 further comprising at least two deflecting devices to deflect the outflowing liquid into a selected tank to change over the out flow from said treatment receptacle, said at least two deflecting devices being placed in a cascade—or family tree way beneath each other and means to switch them over independently of each other, to serve three or more separate storage tanks.

10. An apparatus as claimed in claim 1 further comprising at least one deflecting device of the outflowing liquid from said treatment receptacle into one selected tank at a time, said deflecting device having a swivelling shaft, a pot-shaped deflecting device rotatably mounted having a free outlet at a certain distance from the swivelling shaft overlapping the outlet funnel from below.

11. Arrangement as claimed in claim 10, characterized by the feature that the deflecting device overlaps the return-flow funnel with radial play and consists of two pot-shaped parts boxed into each other at a small distance, with free co-axial outlets which are rotatable as one unit, whereby the return funnel is surrounded by a collar which projects downwards from the underside of the receptacle bottom into the space between the pot-shaped parts.

References Cited

UNITED STATES PATENTS

| 1,674,064 | 6/1928 | Ridley | 134—72 |
| 2,575,493 | 11/1951 | Hilliker | 134—95 XR |
| 3,060,944 | 10/1962 | Brollo | 134—95 XR |

ROBERT L. BLEUTGE, Primary Examiner

U.S. Cl. X.R.

134—72, 103